Patented Apr. 1, 1952

2,591,466

UNITED STATES PATENT OFFICE 2,591,466

RESINOUS COMPOSITION COMPRISING ZEIN, RESINOUS PINEWOOD EXTRACT, AND LIQUID PHENOLIC RESIN

William W. Reynolds and Goldner F. Lipsey, Pittsfield, Mass., assignors to General Electric Company, a corporation of New York No Drawing. Application April 28, 1950, Serial No. 158,934

4 Claims. (Cl. 260—7)

The present invention relates to resinous compositions and more particularly to a resinous composition for use in coating and impregnating applications as a substitute for shellac.

Shellac is commonly used as a coating and impregnating material particularly for electrical applications in which the coated product may come in contact with various insulating fluids such as transformer oils, halogenated aromatic hydrocarbons and the like. The characteristics which make shellac a favored material for such applications include the case with which it can be applied as a coating and impregnating material as, for example, in the impregnating of paper insulation in tape form. The usual shellac solutions dry readily to a tack-free state and when heated to relatively moderate elevated temperatures become relatively insoluble. In addition, shellac is substantially unaffected by various hydrocarbon oils and chlorinated aromatics employed as liquid dielectrics in the various forms of electrical apparatus such as transformers and the like.

Numerous attempts have been made to duplicate the properties of shellac in synthetic resinous compositions. These attempts have, however, not been successful. For example, some of the resultant products possessing the drying and thermosetting properties of shellac compositions were not inert with respect to the various dielectric fluids. Others which were relatively inert with regard to such dielectric fluids did not possess the drying or thermosetting characteristics of the shellac and could not be applied, for example, to paper insulation employing the same apparatus now used in making shellac impregnated paper insulation.

The present invention has as its principal object to provide a synthetic material having the chemical and physical properties of shellac.

A further object of the present invention is to provide a synthetic resin composition which does not contaminate electrical insulating fluids coming in contact therewith and which can be applied to sheet material such as paper and the like employing the same type of equipment now used with shellac.

A further object of the invention is to provide a shellac substitute which is less costly than shellac and which is composed of materials commercially available in the United States.

The above objects and additional objects which will become apparent from the following description are attained in accordance with the present invention by providing a resinous coating and impregnating composition containing as the essential ingredients thereof zein, an extracted pinewood pitch known as "Vinsol," certain resinous reaction products of phenol and formaldehyde and a solvent consisting of ethyl alcohol or a mixture of ethyl alcohol and ethyl Cellosolve (monoethyl ether of ethylene glycol).

The extracted pinewood pitch is a well known material obtained by the extraction of pinewood and comprising oxidized resin acids, oxidized terpenes, polyphenols and polymerized terpenes. The material is a residue which frequently also contains some ligneous matter which remains after the separation of rosin, turpentine and other valuable constituents from pinewood resins. The material is the residual resin obtained by dissolving wood rosin in a gasoline type solvent, extracting color bodies in a selective solvent such as furfuryl or phenol, separating the selective solvent portion and recovering the volatile part of it to leave a residue of dark, fusible and combustible resin characterized by insolubility in aliphatic petroleum fractions. This material is also described as the light petroleum hydrocarbon insoluble, aromatic hydrocarbon soluble resinous extract of pinewood.

The phenolic resin constituent of the composition of the present invention is obtained by heat reacting a phenolic reactant containing at least 70% phenol with formaldehyde in the ratio of one mol phenol to from 1.35 to 1.5 mol formaldehyde in the presence of about 1 to 2% by weight of sodium hydroxide based on the phenolic reactant. In addition to phenol, the phenolic reactant may contain up to 35% cresol and the use of from at least 30 to 35% by weight of cresol is ordinarily preferred to obtain a material which is even smoother and faster drying than are the compositions obtained when phenol is the only phenolic reactant. The phenolic reactant and formaldehyde are maintained at reacting temperatures under reflux and then dehydrated under vacuum to a temperature of 90° C. The resin is cut with ethyl alcohol to a solids content of 68 to 72%. This product is a liquid material, the solids content referring to the amount of non-vaporizable or solidifiable material remaining after removal of the volatile components thereof such as the water or alcohol.

In general, the preferred coating and impregnating compositions comprise by weight from 20 to 30 parts zein, from 1.5 to 4 parts of the extracted pinewood pitch, from 29 to 43 parts of the liquid phenolic resin, and from 23 to 75 parts ethyl alcohol and from 0 to 86 parts ethyl Cellosolve. Up to 3 per cent of an alcohol soluble wax such as a high molecular weight polymer of ethylene glycol may also be included. While the phenolic resin constituent of this composition is a very viscous liquid at room temperatures which does not completely air dry, the presence of the specified amounts of the extracted pinewood pitch and zein impart to the final composition air drying properties and a high softening point in addition to a high gloss and good toughness in the converted or thermoset product.

As has been previously indicated, phenolic resin obtained by the use of phenolic reactant containing at least 20 to 30% cresol, balance phenol, is preferred when drying such a resin. A particularly useful composition possessing the desirable characteristics of shellac is obtained by using a phenolic resin prepared as described hereinbefore from 1.5 mols formaldehyde and 1 mol of a phenolic reactant consisting of ⅔ phenol and ⅓ cresol using 1% NaOH. A preferred composition is a solution of 36 parts by weight of phenolic resin, 25 parts by weight of zein, 2 parts of extracted pinewood pitch in a mixture of 23 parts ethyl alcohol and 86 parts ethyl Cellosolve. This resultant material may be either roll or brush coated on to a paper tape and the resultant product oven or air dried. The coating material dries rapidly in less than 30 seconds at a temperature of approximately 140° C. to give a product which is non-tacky, smooth and tough at room temperature. This product softens at 90 to 100° C. and becomes very soft and sticky at about 120° C. At this latter temperature it cures rapidly to a hard, insoluble and infusible mass which is unaffected by hydrocarbon oil and chlorinated aromatics and does not appreciably affect the dielectric characteristics of these liquids.

Due to the rapid rate at which the composition dries to a non-tacky, non-blocking state, it can be substituted directly for shellac in the manufacture of resin coated paper employing the machines now used in the manufacture of shellac coated paper. The coated material can be stored as, for example, in roll form without sticking of adjacent laminations. When ultimately applied as, for example, as insulation for an electrical coil, further heat treatment of the material in ovens at temperatures of 120° C. or above will effect the final cure of the coating composition to a hard, insoluble and infusible state where it is unaffected by the usual dielectric liquids which may come in contact therewith.

While the invention has been particularly described with reference to the manufacture of insulating tape from a fibrous sheet such as paper for use in connection with insulating dielectric liquids, it is to be understood that it is not limited thereto. The resinous composition of the present invention can also be employed for various adhesive applications as, for example, in the bonding of paper to paper, paper to cloth, cloth to cloth, paper to metal, paper to enameled wire, pressboard to pressboard, etc. It may also be used as a laminating varnish for the production of laminated sheets and cylinders by conventional methods.

What we claim as new and desire to secure by Letters Patent of the United States is:

1. A coating and impregnating composition comprising, by weight, of (1) from 20 to 30 parts zein, (2) from 1.5 to 4 parts of the light petroleum hydrocarbon insoluble, aromatic hydrocarbon solvent soluble resinous extract of pinewood, (3) from 29 to 43 parts of a liquid phenolic resin composition containing from 68 to 72 per cent solids and obtained by heat reacting one mol of a phenolic reactant containing at least 70 per cent phenol with 1.35 to 1.5 mols formaldehyde in the presence of about 1 to 2 per cent, by weight, of sodium hydroxide, (4) 23 to 75 parts ethyl alcohol, and (5) up to 86 parts monoethyl ether of ethylene glycol, said composition drying to a tackless mass which softens at 90–100° C. and curing at a more elevated temperature to an insoluble and infusible mass resembling shellac in its fast drying, plastic and thermosetting characteristics.

2. A coating and impregnating composition comprising, by weight, of (1) from 20 to 30 parts zein, (2) from 1.5 to 4 parts light petroleum hydrocarbon insoluble, aromatic hydrocarbon solvent soluble resinous extract of pinewood, (3) from 29 to 43 parts of a liquid phenolic resin composition containing from 68 to 72 per cent solids and obtained by heat reacting one mol of a phenolic reactant containing at least 70 per cent phenol and 30 to 35% cresol with 1.35 to 1.5 mols formaldehyde in the presence of about one per cent, by weight, of sodium hydroxide, (4) 23 to 75 parts ethyl alcohol, and (5) up to 86 parts monoethyl ether of ethylene glycol, said composition drying to a tackless mass which softens at 90–100° C. and at about 120° C. curing to an insoluble and infusible mass resembling shellac in its fast drying, plastic and thermosetting characteristics.

3. An insulating material comprising a fibrous base coated and impregnated with a composition comprising, by weight, of (1) from 20 to 30 parts zein, (2) from 1.5 to 4 parts of the light petroleum hydrocarbon insoluble, aromatic hydrocarbon solvent soluble resinous extract of pinewood, (3) from 29 to 43 parts of a liquid phenolic resin composition containing from 68 to 72 per cent solids and obtained by heat reacting one mol of a phenolic reactant containing at least 70 per cent phenol with 1.35 to 1.5 mols formaldehyde in the presence of about 1 to 2 per cent, by weight, of sodium hydroxide, (4) 23 to 75 parts ethyl alcohol, and (5) up to 86 parts monoethyl ether of ethylene glycol, said composition drying to a tackless mass which softens at 90–100° C. and, at about 120° C., curing to an insoluble and infusible mass resembling shellac in its fast drying, plastic and thermosetting characteristics.

4. An insulating material comprising a paper sheet coated and impregnated with a composition comprising, by weight, of (1) from 20 to 30 parts zein, (2) from 1.5 to 4 parts of the light petroleum hydrocarbon insoluble, aromatic hydrocarbon solvent soluble resinous extract of pinewood, (3) from 29 to 43 parts of a liquid phenolic resin composition containing from 68 to 72 per cent solids and obtained by heat reacting a phenolic reactant containing at least 70 per cent phenol and 30 to 35% cresol with 1.5 mols formaldehyde in the presence of about one per cent, by weight, of sodium hydroxide based on the weight of the phenolic reactant, (4) 23 parts ethyl alcohol, and (5) 36 parts monoethyl ether of ethylene glycol, said composition drying to a tackless mass which softens at 90–100° C. and at about 120° C. curing to an insoluble and infusible mass resembling shellac in its fast drying, plastic and thermosetting characteristics.

WILLIAM W. REYNOLDS.
GOLDNER F. LIPSEY.

(References on following page)

REFERENCES CITED

The following references are of record in the file of this patent:

UNITED STATES PATENTS

| Number | Name | Date |
|---|---|---|
| 2,102,623 | Hanson | Dec. 21, 1937 |
| 2,114,393 | Lane | Apr. 19, 1938 |
| 2,185,110 | Coleman | Dec. 26, 1939 |
| 2,185,118 | Coleman | Dec. 26, 1939 |
| 2,185,122 | Coleman | Dec. 26, 1939 |
| 2,193,026 | Hall | Mar. 12, 1940 |
| 2,260,187 | Miller | Oct. 12, 1941 |
| 2,276,304 | Hunter | Mar. 17, 1942 |
| 2,385,722 | Navikas | Sept. 25, 1945 |
| 2,391,368 | Underwood | Dec. 18, 1945 |
| 2,407,225 | Dixon | Sept. 10, 1946 |

OTHER REFERENCES

Hercules, Vinsol Resin, 1939, pages 5, 8, 10.

Scheiber and Sandig, Artificial Resins, 1931, published by Pitman and Sons Ltd., pages 275, 276, 284 and 285.

Townsend et al., Chemical Industries, vol. 54, No. 3, March 1944, page 356.

Hercules, Vinsol Resins, 1939, pages 15 and 16.